Patented Aug. 8, 1950

2,517,764

UNITED STATES PATENT OFFICE 2,517,764

ADHESIVE-LAMINATED RUBBER-HYDROCHLORIDE AND REGENERATED-CELLULOSE SHEET

Clarence M. Carson, Cuyahoga Falls, Ohio, assignor to Wingfoot Corporation, Akron, Ohio, a corporation of Delaware No Drawing. Application December 4, 1945, Serial No. 632,790

1 Claim. (Cl. 154—50)

This invention relates to a new product suitable for wrapping various materials, the manufacture of bags, etc. The product is a laminated sheet composed of a ply of rubber hydrochloride film and a sheet of regenerated cellulose suitably bonded together. The composite sheet is more resistant to the passage of moisture and gases than either sheet alone.

It has generally been recognized that rubber hydrochloride film is highly moisture resistant. Regenerated cellulose sheets, when suitably coated, have, likewise, been recognized as moistureproof wrapping materials. However, since rubber hydrochloride film is more resistant to the passage of moisture vapor than regenerated cellulose, this film material is utilized in the laminated sheet of this invention as the moistureproof barrier. Although highly resistant to the passage of moisture vapor, rubber hydrochloride film permits the slow permeation of certain gases, such as oxygen, through it. Regenerated cellulose (whether coated or uncoated) is highly resistant to the passage of oxygen and, likewise, probably other bases to which rubber hydrochloride film is not so resistant.

For the packaging of certain materials, resistance to the passage of both moisture vapor and oxygen is highly desirable. For example, unless a sheet is highly impermeable to the passage of oxygen, it will not hold a tight vacuum and cannot be used for the production of flexible packages which are to be vacuumized. Likewise, in the packaging of certain foodstuffs under normal pressure, it is desirable to exclude oxygen as well as moisture because the oxygen has a deteriorating effect on the food.

In laminating the rubber hydrochloride film to the cellophane (which may be either moistureproofed or uncoated) any one of various adhesives may be employed. A satisfactory adhesive is made from 100 parts of the oxidized cyclized rubber with a distortion point of 5–35° C. manufactured by The Goodyear Tire & Rubber Company and sold as Pliolite P–1233 by adding 10 per cent of paraffin. This mixture may be made by melting the two materials together. The product is dissolved in toluol or a mixture of toluol and gasoline for spreading on either the rubber hydrochloride film (Plioflim) or the regenerated cellulose (cellophane). A thin layer of the adhesive may be applied to each of the different materials and the two then united by pressure. (Distortion point is determined as follows: The dried reaction product of the rubber cyclization in its unmilled, or powdered state is molded by heat and pressure in a sheet ten inches square and one-eighth inch thick. From this sheet, one-inch wide strips are cut. These are placed on two fulcrums, one inch high and eight inches apart which are immersed in a water bath. The temperature of the water is raised 1° C. per minute. At each minute the strip of molded sheet is pushed down at the midpoint between the fulcrums until it touches the bottom of the bath. The pressure is immediately released. When the strip softens to the point where it does not return to its original straight position, the temperature is noted and this is called the distortion point. For a further disclosure of Pliolite P–1233 see Carson 2,328,534, of which this application is a continuation-in-part as explained below.)

The laminated sheet thus produced has high resistance to the passage of moisture vapor and oxygen and other gases. The rubber hydrochloride film may be of the order of .001 inch thick and may be thicker, such as .0012 or .0014 inch thick or thicker, for airplane motors or the like; or it may be a thinner film, such as a film less than .001 inch thick as, for example, a film .0004 or .0008 inch thick. A third material may be laminated to the regenerated cellulose and rubber hydrochloride film if for any reason this seems desirable. The two plies are transparent, and one or both may be printed, and the printing may be on one of the surfaces to which the adhesive is later applied.

This application is at least in part a continuation of my application Serial No. 496,434, filed July 28, 1943, which has matured into U. S. 2,413,432 and which in turn is at least in part a continuation of my application Serial No. 488,087, filed May 22, 1943, now abandoned, which in turn is at least in part a continuation of my application Serial No. 311,945, filed December 30, 1939, which has matured into U. S. 2,328,534.

What I claim is:

A laminated sheet consisting of one ply of rubber hydrochloride and one ply of regenerated cellulose united by a homogeneous mixture of ten parts of paraffin and one hundred parts of oxidized cyclized rubber with a distortion point of 5–35° C.

CLARENCE M. CARSON.

REFERENCES CITED

The following references are of record in the file of this patent:

UNITED STATES PATENTS

| Number | Name | Date |
| --- | --- | --- |
| 2,128,652 | Kratz et al. | Aug. 30, 1938 |
| 2,136,544 | Gebauer-Fuelnegg et al. | Nov. 15, 1938 |
| 2,188,286 | Merrill | Jan. 23, 1940 |
| 2,291,208 | Brown et al. | July 28, 1942 |
| 2,291,700 | Dreyfus | Aug. 4, 1942 |
| 2,300,368 | Harmon | Oct. 27, 1942 |